No. 680,275. Patented Aug. 13, 1901.
W. E. PHILLIPS.
HAND DIGGING IMPLEMENT.
(Application filed Feb. 26, 1901.)
(No Model.)
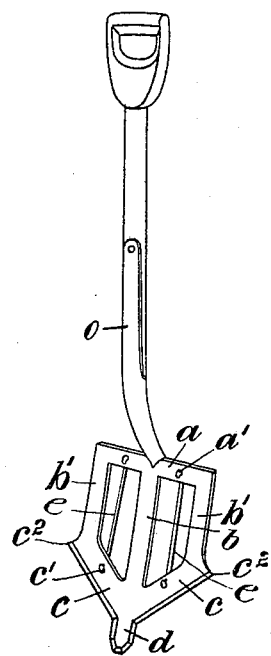
Attest
Walter Donaldson
Edw. L. Reed
Inventor
William Edwin Phillips
by Richards & Co
Attys

UNITED STATES PATENT OFFICE.

WILLIAM E. PHILLIPS, OF CHESTER, ENGLAND.

HAND DIGGING IMPLEMENT.

SPECIFICATION forming part of Letters Patent No. 680,275, dated August 13, 1901.

Application filed February 26, 1901. Serial No. 48,927. (No model.)

*To all whom it may concern:*

Be it known that I, WILLIAM EDWIN PHILLIPS, a subject of the King of England, and a resident of Hamilton Hey, Chester, in the county of Chester, England, have invented certain new and useful Improvements in Hand Digging Implements, of which the following is a specification.

This invention has reference to hand digging implements, and has more particularly for its object and effect to provide an implement which is light, requires less labor to use, and is more effective in its operation on the soil and produces a better tilth.

It has also for its object to provide an implement which may be used with advantage for general digging purposes, including the lifting of potatoes and the like.

The digger is illustrated in the drawing, in which the figure is a perspective view of the implement.

The blade of the implement is made out of a single piece of metal—say steel—and comprises a horizontal cross head or bar $a$ at the top, extending on each side from the handle part $o$, a central vertical bar $b$, extending from the top to the bottom of the blade, two vertical side bars $b'$, extending down at each side, an inclined bottom bar $c$ at each side of the central bar $b$, extending at an angle—say at about forty or fifty degrees—from the central bar upward and outward, and a toe $d$, projecting down below the inclined entrance-bar $c$. The bars $c$ at their lower edge of course form the entrance or cutting edge, and they are carried out on each side and project at $c^2$ beyond the outside vertical edges of the bars $b'$ for a substantial distance. The toe $d$ is tapered inward at its tip, which is preferably made with a cutting edge.

In the bars $a$ and $c$ holes $a'$ and $c'$ are provided, respectively, and in these holes the ends of wires $e$ may be fastened, which extend down over the opening in each side of the blade. These wires may be introduced and used more particularly with advantage when the tool is to be used as a potato-fork, and they obviously can be easily put in and taken out.

The functions and effects of the construction or form of the implement as a whole and of the parts are as follows: The implement as a whole, excepting, of course, the handle openings on each side of the center enable the portion $o$, constitutes a blade. The large tool to be used efficiently as a potato fork or raiser and at the same time make the implement light. The inclined lower entrance-bars $c$ enable the implement to be pressed into the earth with very little labor, and the outwardly-projecting corners $c^2$ of the base $c$ make a cut down through the ground when pressing it down, which avoids friction between the earth and the outer vertical edges of the bars $b'$ and also causes the implement to remove a greater amount of earth than the width between the edges of the bars $b'$. Thus a quantity of earth is raised in each action which is in width equal substantially to the width of the tool across the angles $c^2$, and consequently for a given amount of earth raised a considerable weight of metal is saved over an ordinary-shaped spade.

The toe $d$ serves as subsoiler, aerating the land without bringing much of the subsoil up, and producing a small underground channel at the bottom of the trench being dug, which will serve to carry off the superabundant moisture; besides, the trench being made uneven at the bottom by this toe promotes the draining away of the water.

The implement will thus be seen to constitute a combined digging-spade, potato-lifter, and subsoiler.

From tests made it is calculated that the resistance to the entrance of the implement into the ground is reduced to about one-sixteenth of that of an ordinary spade with a horizontal or straight edge, and consequently labor, assisted by the lightness of the tool, is much reduced from that required for working an ordinary spade and time is gained, and, further, it enables a boy to dig a plot of ground with greater ease than a strong laborer can dig the same-sized plot with an ordinary spade, and, moreover, he could dig it much deeper and produce a finer tilth, while the implement in the hands of an expert workman will enable him to dig at least twice as much ground in a day as with an ordinary spade and without extra strain.

In using the implement as a potato-digger there is not so much liability of sticking or bruising the tubers, besides having the effect upon the ground as regards tilth, as above mentioned. Then double digging, which is considered so expensive, is unnecessary in light soils, as a depth of eighteen inches can easily be reached with this implement with only a small amount of additional labor.

What is claimed in respect of the herein-described invention is—

1. A hand digging implement comprising a blade consisting of a horizontal bar $a$; a central vertical bar $b$; outside vertical bars $b'$; upwardly and outwardly inclined lower bars $c$, extending between the lower ends of the bars $b$ and $b'$, the said bars $c$ being extended beyond the outside vertical edges of the bars $b'$; and the projecting toe $d$ extending down below the edge of the bars $c$; all the said bars and parts being integral with each other at the parts of junctions therewith, respectively; substantially as described.

2. A hand digging implement, comprising upper and lower bars, and vertical central and outside vertical bars, integral therewith, constituting a blade with an aperture between the said central, outside, and upper and lower bars, on each side of the center bar, and having the lower entrance edge of the blade extended beyond the vertical outside edges of the outside vertical bars; substantially as described.

3. A hand digging implement, comprising upper and lower bars, and vertical central and outside vertical bars, integral therewith, constituting a blade with an aperture between the said central, outside, and upper and lower bars, on each side of the center bar, and having the lower entrance-bars upwardly and outwardly inclined from the lower part of the central, vertical bar, and extended beyond the vertical outside edges of the outside vertical bars; substantially as described.

4. A hand digging implement, comprising upper and lower bars, and vertical central and outside vertical bars, integral therewith, constituting a blade with an aperture between the said central, outside, and upper and lower bars, on each side of the center bar, and having the lower entrance-bars upwardly and outwardly inclined from the lower part of the central vertical bar; and holes in the upper and lower bars at parts between the vertical central and outside bars, adapted to hold wires to extend vertically over the said openings in the blades; substantially as described.

In witness whereof I have hereunto set my hand in presence of two witnesses.

WILLIAM E. PHILLIPS.

Witnesses:
ERNEST B. ROYSTON,
JNO. W. BROWN.